BEAM-INDEXING PICTURE DISPLAY SYSTEM

Filed Feb. 14, 1961 3 Sheets-Sheet 1

INVENTOR
DENNIS ARTHUR RUDD
BY
AGENT

INVENTOR
DENNIS ARTHUR RUDD
BY
AGENT

Dec. 29, 1964 D. A. RUDD 3,163,713

BEAM-INDEXING PICTURE DISPLAY SYSTEM

Filed Feb. 14, 1961 3 Sheets-Sheet 3

INVENTOR
DENNIS ARTHUR RUDD
BY
Frank R. Jifani
AGENT

United States Patent Office 3,163,713

Patented Dec. 29, 1964

3,163,713

BEAM-INDEXING PICTURE DISPLAY SYSTEM

Dennis Arthur Rudd, Redhill, Surrey, England, assignor to North American Philips Company, Inc., New York, N.Y., a corporation of Delaware Filed Feb. 14, 1961, Ser. No. 89,141

Claims priority, application Great Britain Mar. 30, 1960

6 Claims. (Cl. 178—5.4)

Figures 1, 2:
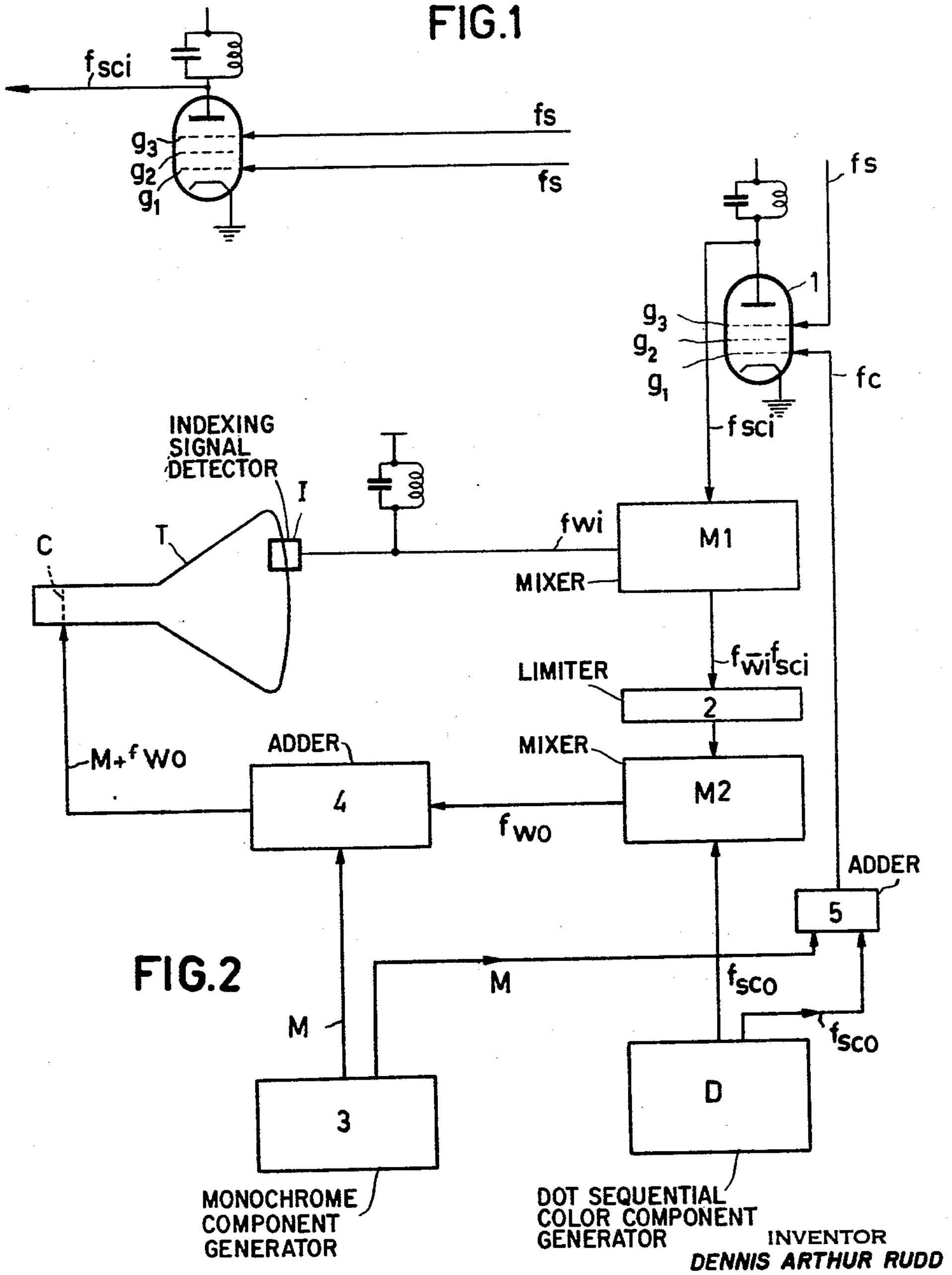

This invention relates to beam indexing display arrangements for the display of colour television pictures comprising a cathode-ray display tube with a screen having an iterative pattern of groups of indexing and colour stripes, means for modulating the intensity of the beam in accordance with the desired display, means for producing at least one indexing signal of approximately sinusoidal form from the traversal of the indexing stripes by the beam which signal contains stable phase errors due to intensity modulation of the beam.

In the beam indexing type of a colour television display tube, information is derived either continuously or periodically about the position of the electron beam relative to the array of colour-producing elements on the tube screen. This information is used either to maintain the correct positional relationship between the electron beam and the array of elements, or to maintain the correct time relationship between the signal which is applied to the beam intensity control electrode of the display tube and the beam position.

Many forms of tube and circuit arrangement have been described or suggested. In one arrangement a single-gun cathode-ray tube is used, and the array of the said colour-producing stripes therein takes the form of fine parallel stripes of phosphors orientated vertically and arranged in the repetitive sequence red, blue, green, red, blue, green . . . (this type of sequence is known as a "continuous" colour sequence by contrast with so-called "reversing" sequences). Between adjacent phosphor stripes there may be provided non-luminescent guardbands whose function is to assist in the achievement of saturated colours. As the electron beam is deflected horizontally across the screen, the phosphors luminesce in sequence, the amount of light that is emitted by a particular phosphor being determined by the signal applied to the tube at the instant the beam strikes that phosphor.

The frequency at which the sequence of stripes is scanned by the beam is referred to as the writing frequency ($f_W$).

It is necessary to define the expression "indexing characteristic waveform" which will be used herein for convenience. This expression is used to denote the current waveform (including the D.C. component) that is obtained as an indexing signal by scanning the indexing stripes with an unmodulated beam. This characteristic waveform depends on the external circuits of the cathode-ray tube inasmuch as they effect the focusing and size of the spot, and it depends also on the ratio between the width of the indexing stripes of the screen, and the distances between them. If the display tube spot were of infinitesimal width this waveform would be a rectangular wave, but in practice the finite spot size causes degradation of the waveform edges. The phase of the fundamental component of this waveform is by definition the desired phase of the indexing signal.

The operation of indexing may be regarded as multiplying the cathode-ray beam current by the indexing characteristic waveform and so the indexing signal varies both in amplitude and phase in a way which depends on the amplitude and phase of the applied colour signal. Such variations can cause phase errors and also instability in the colour rendering.

Stability for the purposes of this specification, may be regarded as the condition in which the colour rendering of the system, although possibly incorrect, remains constant for a given colour signal. In the particular case of a system which employs a colour signal which is a sine-wave of constant frequency with a varying phase which represents hue, this stability may be regarded as the condition in which there is a substantially fixed hue in the colour-rendering for any given phase of the colour signal.

Such stability can be obtained in various ways. For example, if a system as described in copending patent application Serial No. 43,814, filed July 19, 1960, is used, stability can readily be achieved with the aid of two partial indexing signals.

On the other hand, stability can be obtained by using two indexing signals obtained from two sets of ultraviolet indexing stripes provided one on each side of the screen in the manner described in copending patent application Serial No. 64,191, filed October 21, 1960.

Moreover it can be said that the system will also be stable for the display of rather desaturated colours.

However, after stability has been achieved with the aid of one of the above described systems there still remain some phase errors due to the fact that these systems can be thought to be more or less symmetrical in nature so that in the final waveform the even harmonics of the fundamental component of the indexing waveform are eliminated but the odd harmonics thereof still occur (as explained above the final waveform is obtained by multiplying the beam current with the indexing characteristic waveform and thus, due to this multiplication, the fundamental component of the indexing waveform and higher harmonics thereof are present in the final indexing signal).

The presence of these odd harmonics still disturbs the derived phase of the indexing signal with respect to the phase of the fundamental component and to eliminate these so-called stable phase error the arrangement in accordance with the invention is characterized in that the arrangement comprises further means for developing at least one additional signal with simulated stable phase errors, means for combining the additional signal with the said simulated phase errors with the indexing signal so as to cancel substantially the stable phase errors still occurring in said indexing signal and means for using the resultant phase corrected indexing signal to maintain the required relationship between the beam modulation and the position of the beam relative to the stripe pattern.

As in other systems, selected colour stripes may be used as indexing stripes so as to co-operate with photo-electric means. However, it is more usual to have separate indexing stripes which may for example be of secondary-emissive or conductive material or may emit ultraviolet light.

As will be understood from the following description, the frequency at which the simulation is performed is not restricted to any particular frequency but such frequency should not be so low as to cause unwanted distortions in the required signal.

Specific embodiments of the invention will now be described by way of example with reference to the accompanying diagrammatic drawings in which:

FIG. 1 shows the means for developing an additional signal with simulated phase errors.

Figures 3, 4:
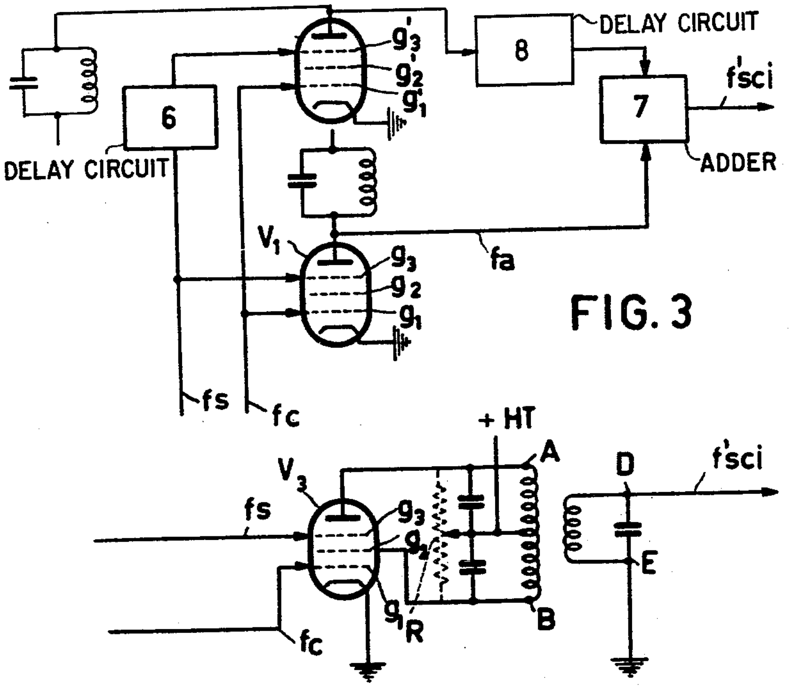
Figure 6:
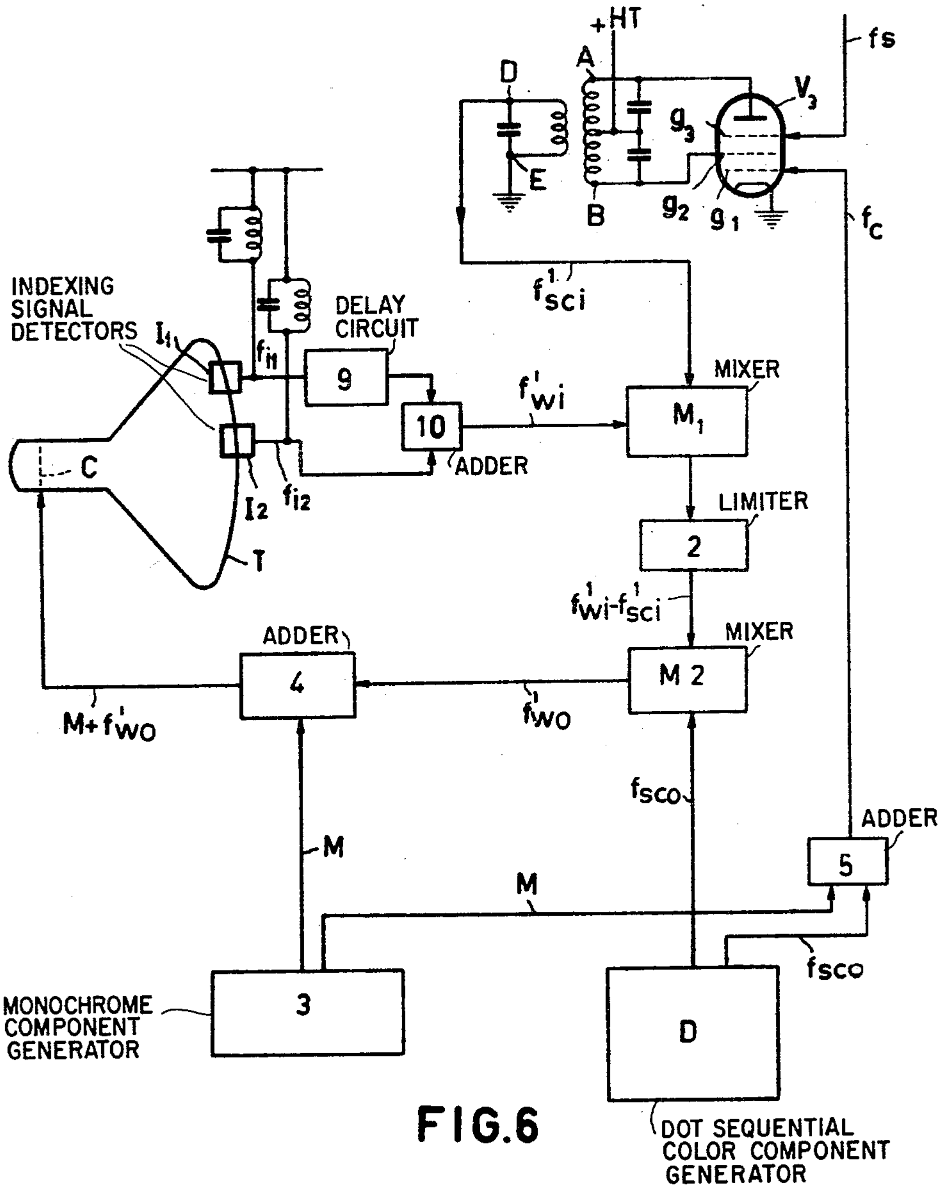

FIG. 2 shows the whole beam-indexing display arrangement together with the means shown in FIG. 1, FIG. 3 shows further means for developing two additional signals with simulated stable phase errors for use in a display arrangement in which two partial indexing signals are developed, FIG. 4 shows means which also develops two additional signals with simulated stable phase errors but which are modified with respect to the means shown in FIG. 3, FIGS. *5a* and *5b* are for the purpose of explanation of the means shown in FIG. 4 and FIG. 6 shows another beam indexing display arrangement together with the means shown in FIG. 4.

It will be assumed for the purposes of the description that the composite colour signal is available in dot-sequential form consisting of a colour component at sub-carrier frequency together with a monochrome component. Such colour signal may be derived from the equivalent NTSC signal by application of a method of signal processing known as "Y to M conversion and sub-carrier modification." However, the operation of apparatus according to the invention, and in particular the operation of the arrangements which will be described, does not depend on the use of such a signal. For example, it is known that the NTSC signal can be utilized with tubes suitable for dot-sequential display without producing unduly large colour errors and, in this case, the colour signal would be available in the form of chrominance and luminance components.

First an arrangement will be described with reference to FIGURES 1 and 2 which arrangement is based on the use of a single indexing signal derived from a single set of indexing stripes one of which is provided for each group of colour phosphors, a group comprising preferably three stripes for red, green and blue respectively.

It is pointed out that with such an arrangement the system will be stable only for the display of rather desaturated colours. However, the simplicity of such an arrangement will assist in the initial description of the invention, after which examples will be given (with reference to FIGS. 3 to 6) in which stability with a more practical degree of saturation can be obtained with the aid of two partial indexing signals.

In the cathode-ray tube T, the colour signal produces a beam current which depends on the "gamma" of the tube and the indexing signal, which is produced by the means I, is obtained by multiplying the beam current by the indexing characteristic waveform. This indexing signal can be simulated by applying a signal $f_c$ corresponding to the beam modulation signal to the control electrode $g_1$ of an electron discharge device or a valve 1, having (for that electrode) a current-voltage characteristic curve similar in shape to that of the cathode-ray tube T. The cathode current of the valve 1 will thus have a waveform identical or substantially identical with that of the cathode-ray tube T.

If a signal $f_s$, having a waveform identical or substantially identical to the indexing characteristic waveform of the indexing stripes of the cathode-ray tube T, is applied to a further control electrode $g_3$ of valve 1 the signals applied to electrodes $g_1$ and $g_3$ will be multiplied so that the anode signal $f_{sci}$ of the valve 1 will correspond to the cathode-ray tube indexing signal obtained from the indexing stripes by means of I.

Having developed this additional signal $f_{sci}$ with the aid of valve 1, it is possible to compare its phase with that of the actual indexing signal $f_{wi}$ and use the result of the comparison to control the phase of the colour signal applied to the cathode-ray tube T.

It should be noted that the additional signal $f_{sci}$ so obtained will have simulated phase errors equal to the undesired phase errors of the indexing signal $f_{wi}$ irrespective of the frequency at which the simulation is carried out due to the fact that the valve 1 was a current-voltage characteristic similar to that of the cathode ray tube T. In particular case where the colour signal is present at sub-carrier frequency $f_s$, it is convenient for the simulation of the errors to be performed at that frequency.

One type of valve having the required characteristic is that normally used in mixing or gating circuits, for example the Mullard type 6AS6 pentode or the American type 6BN6.

FIGURE 1 shows such a pentode with means for applying to the control grid $g_1$ the composite colour signal $f_c$ at sub-carrier frequency so as to obtain a cathode current which simulates the beam current of the cathode-ray tube T (the composite colour signal comprises the monochrome and dot-sequential colour components). Also, a signal $f_s$ is applied to the third grid $g_3$ whose waveform is identical or substantially identical with the indexing characteristic waveform of the cathode-ray tube T, said grid $g_3$ having the property of causing the cathode current to be shared in a controlled manner between the anode and the screen grid $g_2$ of valve 1. In practice, it is sufficient to use a signal $f_s$ of sinusoidal form to represent the indexing characteristic waveform. Since the simulation is carried out in this example at sub-carrier frequency $f_s$, the signal applied to $g_3$ can be the reference sub-carrier itself. Thus the effect of the third grid $g_3$ is similar to that of the indexing stripes in producing an indexing signal. The phase of the anode output signal $f_{sci}$ of valve 1 will therefore vary in substantially the same way as the phase of the indexing signal $f_{wi}$ derived from the cathode-ray tube screen by index means I. The indexing signal $f_{wi}$ has a writing frequency $f_w$ determined by the velocity of the electron beam when scanning the indexing stripes present on the cathode ray tube screen and schematically indicated by indexing means I.

FIGURE 2 shows the simulator valve connected in a beam indexing display arrangement. The indexing signal $f_{wi}$ may be derived from the display screen in various ways all of which involve the use of some means I (indicated generically at I in FIGURE 2 in a schematic manner) for detecting the motion of the beam across the phosphor pattern. The means I may operate on a photo-electric basis or a secondary-emission basis as aforesaid.

The output of the simulator valve is fed to a first frequency changer or mixer $M_1$ together with the actual indexing signal $f_{wi}$, and the difference frequency component $f_{wi}-f_{sci}$ is selected at the output terminals of the mixer $M_1$. The phase of this output signal $f_{wi}-f_{sci}$ is the difference between the phases of the two input signals $f_{wi}$ and $f_{sci}$. Therefore the remaining stable phase errors of the indexing signal $f_{wi}$ are cancelled in the mixer $M_1$ by the simulated phase errors of the additional signal $f_{sci}$. The signal $f_{wi}-f_{sci}$ is then passed through a limiter 2 to remove amplitude variations, and it is then fed to a second mixer $M_2$ together with the dot-sequential signal $f_{sco}$ at sub-carrier frequency $f_s$ which is obtained from the dot-sequential colour component generator D which is normally included in a colour television receiver together with the generator 3 for developing the monochrome component M. The sum frequency component output signal $f_{wo}$ of the second mixer $M_2$ is the desired colour signal modulated on a new sub-carrier with the writing frequency $f_{wi}$ of the indexing signal with the carried phase. This colour signal $f_{wo}$ is added to the monochrome component M in the adder 4 where after the combined signal $M+f_{wo}$ is applied to the control electrode $c$ of the cathode-ray tube T.

The sub-carrier frequency ($f_s$) is a particularly convenient frequency for performing the simulation because the signals required are already available, namely the reference sub-carrier $f_s$ and the composite colour signal $f_c$, and also because the signal obtained from the limiter 2 is at the desired frequency ($f_{wi}-f_{sci}$) for changing the dot-sequential colour signal $f_{sc}$ from the sub-carrier frequency ($f_s$) to the writing frequency ($f_w$). In FIG. 1 the signal applied to control electrode $g_1$ of tube 1 is obtained by combining the monochrome component M with the dot-sequential signal $f_{sco}$ in the device 5. It should be noted that it is not in any way necessary that the developing of the additional signal $f_{sc}$ with simulated phase errors is performed at the sub-carrier frequency ($f_s$). The simulation can be effected at other frequencies.

For example, in a special case, it may be carried out at the writing frequency ($f_w$) in which case the first $M_1$ and second mixers $M_2$ shown in FIGURE 2 must be replaced respectively by a phase detector and a phase modulator. In such a system there is the need to maintain the rate of scanning of the phosphors constant in order to maintain a constant writing frequency ($f_{wi}$).

In the example described with reference to FIGS. 1 and 2 it was assumed that desaturated colours are displayed to ensure stability in the system.

A further arrangement will now be described with reference to FIGS. 3 and 4 wherein the stability is obtained by using two partial indexing signals in accordance with the aforesaid copending patent application Serial No. 43,814, one of the partial signals being phase-shifted by 180° before being combined with the other partial signal to provide a stable final indexing signal $f'_{wi}$.

In this example, the simulator circuit must again reproduce the simulated phase errors of the indexing signal $f'_{wi}$ and, since this system employs two partial indexing signals, simulation of both of the partial signals is to be effected. This may be done in various ways. For example, the arrangement of FIGURE 3 shows two simulator valves $V_1$ and $V_2$ each of which is arranged to operate in the manner described with reference to FIG. 1. Thus the composite colour signal $f_c$ is applied in parallel to both the control grids $g_1$ and $g'_1$. The indexing characteristic waveform (in the form of the reference sub-carrier signal $f_s$) is applied directly to the grid $g_3$ of the first valve $V_1$ and is delayed by 180° in the delay circuit 6 before application to the grid $g'_3$ of valve $V_2$ so as to correspond to the interleaved sets of indexing stripes as arranged in a cathode-ray tube T developed for use in a display arrangement in which two partial indexing signals are produced.

The two additional signals $f_a$ and $f'_a$ (with simulated phase errors) produced at the anodes of the valves $V_1$, $V_2$ are combined in an adder circuit 7 after one of them ($f'_a$) has been shifted by 180° in a delay circuit 8 in a manner corresponding to the operation performed on the actual partial indexing signals obtained from the cathode-ray tube T.

Whereas FIG. 3 shows two separate simulating valves $V_1$ and $V_2$, it is possible to perform the complete operation with one valve $V_3$ by employing a circuit such as that shown in FIGURE 4.

Figure 5A:
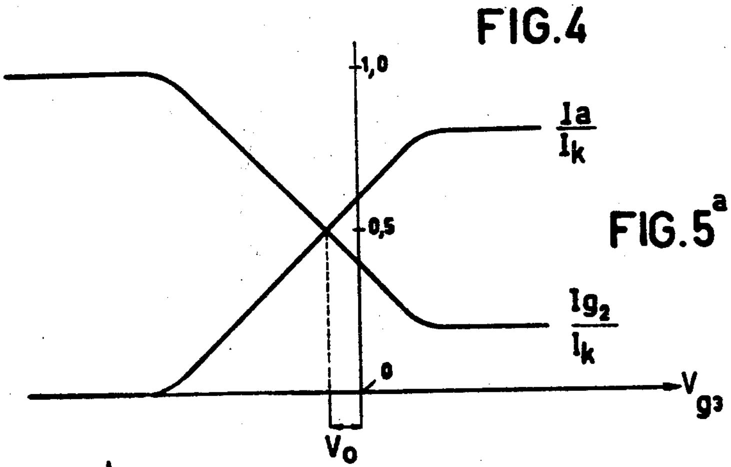
Figure 5B:
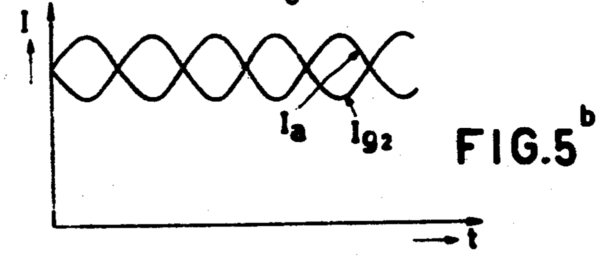

Before describing the circuit of FIG. 4, it will be convenient to examine more closely the sharing characteristic curve of the grid $g_3$ already referred to in connection with FIG. 1. Typical idealized characteristic curves for such a valve are shown in FIG. 5*a*. From these it will be seen that the proportion of the cathode current $I_k$ that flows respectively to the anode (current $I_a$) and to the second grid $g_2$ of valve $V_3$ (current $I_{g2}$) is linearly dependent on the voltage $V_{g3}$ applied to the grid $g_3$. There is a particular value $V_0$ for the voltage of grid $g_3$ at which the currents $I_a$ and $I_{g2}$ are equal. If, therefore, a D.C. bias of $V_0$ is applied to grid $g_3$ in a circuit having the configuration of FIG. 4 (in the absence of any composite colour signal $f_c$ at grid $g_1$) and if the sinusoidal sub-carrier reference signal $f_s$ (representing the indexing characteristic waveform) is applied to grid $g_3$, then the anode current ($I_a$) and the current flowing through grid $g_2$ ($I_{g2}$) will have identical D.C. components and equal sine-wave components in anti-phase (this is illustrated in FIG. 5*b*). These waveforms therefore correspond to the waveform applied to the grids $g_3$ of the valves $V_1$ and $V_2$ of FIG. 3. Thus if now the composite colour signal $f_c$ is applied to the grid $g$ of valve $V_3$ in FIG. 4, the signals obtained at the anode and grid $g_2$ of valve $V'_3$ respectively correspond to the signals obtained at the two anodes of FIG. 3.

Voltages proportional to these currents are developed at points A and B respectively (FIG. 4) so that the total signal $f'_{sc}$ developed across points D–E is proportional to that developed across points A–B which in turn is substantially equal to the difference between the two additional signals obtained from the anode and grid $g_2$ of valve $V_3$. The transformer circuit of FIG. 4, with its capacitances, is tuned to the sub-carrier frequency $f_s$.

It will be apparent that the operation based on taking the difference between the signals at points A–B is equivalent to the operation of the circuit of FIGURE 3 wherein one signal $f'_a$ is delayed by 180° in phase and then added to the other partial signal $f_a$.

It may in practice be necessary to add a variable potentiometer R across the points A–B to permit exact balancing of the impedances in the anode circuit and the $g_2$ grid circuit.

The circuit of FIGURE 4 is shown combined with the display arrangement for developing two partial-indexing signals in FIGURE 6.

In FIG. 6, in which corresponding parts are numbered as far as possible with the same reference numerals as in FIG. 2, there is shown a cathode ray tube T for developing two partial indexing signals $f_{i1}$ and $f_{i2}$ by means of $I_1$ and $I_2$. The first indexing signal $f_{i1}$ is delayed by 180° in the delay circuit 9 and thereafter added to the second indexing signal $f_{i2}$ in the adding device 10 so as to obtain an indexing signal $f'_{wi}$ with a writing frequency ($f_w$). The signal $f'_{wi}$ only contains stable phase errors which are the same as the simulated stable phase errors in the additional signal $f'_{sci}$.

To eliminate these stable phase errors the indexing signal $f'_{wi}$ and the additional signal $f'_{sci}$ are applied to a first frequency changer or mixer $M_1$ for producing the frequency $f'_{wi}-f'_{sci}$ in the same manner as in FIG. 2.

What is claimed is:

1. A beam indexing color television display system comprising a cathode ray tube having an electron gun for producing an electron beam, said gun having a beam intensity control electrode, and a screen disposed in the path of said beam, said screen having an iterative pattern of parallel groups of at least two parallel stripes of material luminescent at different colors, means for deflecting said beam whereby said beam scans said groups of stripes in a continuous sequence, means for deriving an indexing signal from said screen responsive to the scanning of said stripes by said beam, a source of a composite color signal, means for correcting phase errors of said indexing signal due to intensity modulation of said beam, means for applying said composite color signal to said intensity color electrode, and means responsive to the phase corrected indexing signal for maintaining a predetermined relationship between the position of said beam and the modulation of said beam, said means for correcting phase errors comprising means providing an additional signal having phase errors simulating the phase errors of said indexing signal, and means for combining said indexing signal with said additional signal for substantally canceling the phase errors of said indexing signal.

2. A beam indexing color television display system comprising a cathode ray tube having an electron gun for producing an electron beam, said gun having a beam intensity control electrode, said tube having a screen disposed in the path of said beam, said screen having an iterative pattern of parallel groups of at least two parallel stripes of material luminescent at different colors, means for deflecting said beam whereby said beam scans said groups of stripes in a continuous sequence, means for deriving an indexing signal from said screen responsive to the scanning of said stripes by said beams, said indexing signal having phase errors resulting from intensity modulation of said beams, means connected to said indexing signal deriving means for substantially correcting said phase errors, a source of composite color signals, means applying said color signals to said intensity control electrode, and means responsive to said phase corrected index signal for maintaining a predetermined relationship between the position of said beam and the intensity modulation of said beam, said means for correcting said phase errors comprising an electron discharge device having a transfer characteristic similar to the current-voltage characteristics of said cathode ray tube, said device having an input circuit and an output circuit, a source of reference oscillations, means applying said color signal and reference oscillations to said input circuit, mixer means, and means connecting said output circuit and said means deriving an index signal to said mixed means, whereby the output of said mixer means comprises said phase corrected index signal.

3. The system of claim 2, wherein said means for deriving an index signal comprises means for deriving first and second partial indexing signals having a relative phase displacement of 180°, means for delaying said first signal by 180° and combining said delayed first signal with said second signal to provide said index signal, and said means for correcting said phase errors comprises a second electron discharge device having a transfer characteristic similar to the current-voltage characteristics of said cathode ray tube, said second discharge device having a second input circuit and a second output circuit, means applying said color signal and reference oscillations to said second input circuit, means for delaying output signals of said second device by 180°, and means for applying said delayed output signals to said mixer means.

4. A beam indexing color television display system comprising a cathode ray tube having an electron gun for producing an electron beam, said gun having a beam intensity control electrode, said tube having a screen disposed in the path of said beam, said screen having an iterative pattern of parallel groups of at least two parallel stripes of material luminescent at different colors, means for deflecting said beam whereby said beam scans said groups of stripes in a continuous sequence, means for deriving an indexing signal from said screen responsive to the scanning of said stripes by said beam, said indexng signal having phase errors resulting from intensity modulation of said beam, means connected to said indexing signal deriving means for substantially correcting said phase errors, a source of composite color signals, means applying said color signals to said intensity control electrode, and means responsive to said phase corrected index signal for maintaining a predetermined relationship between the position of said beam and the intensity modulation of said beam, said means for correcting said phase errors comprising an electron discharge device having a transfer characteristic similar to the current-voltage characteristic curve of said cathode ray tube, said electron discharge device having first and second control electrodes and an output electrode, means applying said color signal to said first control electrode, a source of oscillations having a waveform substantially identical to the indexing characteristic waveform of the stripes of said cathode ray tube, means for applying said oscillations to said second control electrode, means for deriving a simulated indexing signal connected to said output electrode, mixer means, and means applying said simulated indexing signal and said first-mentioned indexing signal to said mixer means, whereby the output of said mixer means comprises said phase corrected indexing signal.

5. The system of claim 4, wherein said electron discharge device comprises a pentode, said first control electrode and second control electrode comprise the first control grid and suppressor grid respectively of said pentode, and said output electrode comprises the anode of said pentode, comprising means applying a bias voltage to said pentode whereby the ratio of anode current to cathode current is equal to the ratio of the screen grid current to the cathode current of said pentode, a transformer having a primary winding with a midtap, and a secondary winding, means connecting said primary winding between said anode and the screen grid of said pentode, a source of operatng voltage connected to said midtap, means for tuning said primary and secondary windings to the frequency of said simulated indexing signal, and means for deriving said simulated indexing signal from said secondary circuit.

6. The system of claim 4, in which said composite color signals comprise a monochrome component and a color component modulated on subcarrier oscillations, wherein said oscillations having a waveform substantially identical to the indexing characteristic waveform have a frequency equal to the frequency of said subcarrier oscillations.

References Cited in the file of this patent

UNITED STATES PATENTS 2,910,615 Moulton et al. ---------- Oct. 27, 1959

UNITED STATES PATENT OFFICE
CERTIFICATE OF CORRECTION

Patent No. 3,163,713 December 29, 1964

Dennis Arthur Rudd

It is hereby certified that error appears in the above numbered patent requiring correction and that the said Letters Patent should read as corrected below.

In the heading to the printed specification, line 7, for "Mar. 30, 1960" read -- Mar. 3, 1960 --; column 7, line 9, for "mixed" read -- mixer --.

Signed and sealed this 22nd day of June 1965.

(SEAL)
Attest:

ERNEST W. SWIDER
Attesting Officer

EDWARD J. BRENNER
Commissioner of Patents

UNITED STATES PATENT OFFICE

CERTIFICATE OF CORRECTION

Patent No. 3,163,713 December 29, 1964

Dennis Arthur Rudd

It is hereby certified that error appears in the above numbered patent requiring correction and that the said Letters Patent should read as corrected below.

In the heading to the printed specification, line 7, for "Mar. 30, 1960" read -- Mar. 3, 1960 --; column 7, line 9, for "mixed" read -- mixer --.

Signed and sealed this 22nd day of June 1965.

(SEAL)
Attest:

ERNEST W. SWIDER
Attesting Officer

EDWARD J. BRENNER
Commissioner of Patents